United States Patent
Hjelmåker (10) Patent No.: US 12,140,953 B2
(45) Date of Patent: Nov. 12, 2024

(54) PROPULSION CONTROL ARRANGEMENT, ROBOTIC TOOL, METHOD OF PROPELLING ROBOTIC TOOL, AND RELATED DEVICES

(71) Applicant: HUSQVARNA AB, Huskvarna (SE)

(72) Inventor: Olle Hjelmåker, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 251 days.

(21) Appl. No.: 17/032,089

(22) Filed: Sep. 25, 2020

(65) Prior Publication Data

US 2021/0089034 A1 Mar. 25, 2021

(30) Foreign Application Priority Data

Sep. 25, 2019 (SE) .................... 1951079-1

(51) Int. Cl.
*G05D 1/00* (2024.01)
*A01D 34/00* (2006.01)
*B60K 1/00* (2006.01)

(52) U.S. Cl.
CPC ........... *G05D 1/021* (2013.01); *A01D 34/008* (2013.01); *B60K 1/00* (2013.01); *G05D 1/0094* (2013.01)

(58) Field of Classification Search
CPC .............. G05D 1/021; G05D 1/0094; G05D 2201/0201; G05D 1/0265;

(Continued)

(56) References Cited

U.S. PATENT DOCUMENTS

| 3,800,902 A | 4/1974 | Keller |
| 2012/0159916 A1 | 6/2012 | Ishii et al. |

(Continued)

FOREIGN PATENT DOCUMENTS

| CN | 107291071 A | 10/2017 |
| CN | 107402573 A | 11/2017 |

(Continued)

OTHER PUBLICATIONS

Swedish Office Action and Search Report for Swedish Application No. 1951079-1, mailed on Mar. 19, 2020.

(Continued)

*Primary Examiner* — Jaime Figueroa
*Assistant Examiner* — Sihar A Karwan
(74) *Attorney, Agent, or Firm* — BURR & FORMAN LLP (57) ABSTRACT

A propulsion control arrangement (1) for a self-propelled robotic tool (3) is disclosed, wherein the robotic tool (3) comprises at least one swivel caster wheel (5, 5') configured to abut against a ground surface (7) during operation of the robotic tool (3). The control arrangement (1) is configured to, upon detection of a stop event of the robotic tool (3) after travel in a first longitudinal direction (ld1) of the robotic tool (3), turn the robotic tool (3) a predetermined angle (a1), and then initiate propulsion in a second longitudinal direction (ld2) of the robotic tool (3) being opposite to the first longitudinal direction (ld1). The present disclosure further relates to a self-propelled robotic tool (3), a method (100) of propelling a self-propelled robotic tool (3), a computer program, and a computer-readable medium (200).

14 Claims, 4 Drawing Sheets

(58) Field of Classification Search
CPC ......... G05D 2201/0208; G05D 1/0212; G05D 1/02; A01D 34/008; A01D 34/00; A01D 75/28; B60K 1/00
See application file for complete search history.

(56) References Cited

U.S. PATENT DOCUMENTS

| | | |
|---|---|---|
| 2015/0224823 A1 | 8/2015 | Turturro et al. |
| 2015/0366130 A1 | 12/2015 | Bergstrom et al. |
| 2018/0011493 A1* | 1/2018 | Terada ................... B25J 5/007 |
| 2019/0256138 A1 | 8/2019 | Jagenstedt et al. |
| 2019/0299398 A1 | 10/2019 | Svensson |
| 2019/0324472 A1 | 10/2019 | Sun et al. |
| 2020/0353977 A1* | 11/2020 | Davies ................... B62D 7/18 |

FOREIGN PATENT DOCUMENTS

| | | |
|---|---|---|
| DE | 102017114965 A1 | 1/2018 |
| EP | 1532856 A2 | 5/2005 |
| JP | 8504521 A | 5/1996 |
| JP | 2016212668 A | 12/2016 |
| WO | 9410000 A1 | 5/1994 |
| WO | 03103365 A1 | 12/2003 |
| WO | 2017198222 A1 | 11/2017 |

OTHER PUBLICATIONS

Swedish Office Action and Search Report for Swedish Application No. 2050567-3, mailed on Dec. 22, 2020.
International Search Report and Written Opinion for PCT Application No. PCT/EP2021/061771, mailed on Aug. 4, 2021.

* cited by examiner

PROPULSION CONTROL ARRANGEMENT, ROBOTIC TOOL, METHOD OF PROPELLING ROBOTIC TOOL, AND RELATED DEVICES

TECHNICAL FIELD

The present disclosure relates to a propulsion control arrangement for a self-propelled robotic tool. The present disclosure further relates to a self-propelled robotic tool, such as a self-propelled robotic lawnmower, a method of propelling a self-propelled robotic tool, a computer program, and a computer-readable medium.

BACKGROUND

Self-propelled robotic tools, such as self-propelled autonomous robotic lawnmowers, have become increasingly popular, partly because they usually are capable of performing work which previously was made manually. A self-propelled robotic tool is capable of navigating in an area in an autonomous manner, i.e. without the intervention of a user. The robotic tool may move in a systematic and/or random pattern to ensure that the area is completely covered. Some robotic tools require a user to set up a border wire around an area that defines the area to be operated by the robotic tool. Such robotic tools use a sensor to locate the wire and thereby the boundary of the area to be operated. When such a robotic tool reaches the border wire, the robotic tool is usually stopped and then operated in a direction opposite to the direction of travel that the robotic tool had at the time of the detection of the boundary wire.

As an alternative, or in addition, robotic tools may comprise other types of positioning units and sensors, for example sensors for detecting an event, such as a collision with an object within the area. Similarly, when a collision with an object is detected, the robotic tool is usually stopped and then operated in a direction opposite to the direction of travel that the robotic tool had at the time of the detection of the collision.

One problem associated with robotic tools is wear and tear of the area operated by the robotic tool. As an example, wheel slip of one or more wheels of the robotic tool may cause unwanted marks in the area operated by the robotic tool. Moreover, many areas comprise more or less slopes which may pose problems for the traction and navigability of the robotic tool, especially in wet conditions. Problems for the traction and navigability of the robotic tool may adversely affect the coverage of an area operated by a robotic tool. In addition, the presence of slopes in an area operated may significantly increase the probability of unwanted marks in the area due to an increased risk for wheel slip.

Moreover, generally, on today's consumer market, it is an advantage if products, such as robotic tools and their associated devices, have conditions and/or characteristics suitable for being developed and manufactured in a cost-efficient manner.

SUMMARY

It is an object of the present invention to overcome, or at least alleviate, at least some of the above-mentioned problems and drawbacks.

According to a first aspect of the invention, the object is achieved by a propulsion control arrangement for a self-propelled robotic tool, wherein the robotic tool comprises at least one swivel caster wheel configured to abut against a ground surface during operation of the robotic tool. The control arrangement is configured to, upon detection of a stop event of the robotic tool after travel in a first longitudinal direction of the robotic tool, turn the robotic tool a predetermined angle, and then initiate propulsion in a second longitudinal direction of the robotic tool being opposite to the first longitudinal direction.

A swivel caster wheel is a wheel pivotally attached to the robotic tool around a pivot axis, wherein the pivot axis is arranged at a distance from a wheel axle of the swivel caster wheel, and wherein the pivot axis is substantially perpendicular to the ground surface. Such a wheel is free to pivot around the pivot axis such that a rolling direction of the wheel can follow a travel direction of the robotic tool. A swivel caster wheel has a first rotational direction in which it is intended to rotate. Due to these features, upon detection of a stop event of the robotic tool after travel in a first longitudinal direction of the robotic tool, the rolling direction of the swivel caster wheel will be parallel to the first longitudinal direction and the wheel axle of the swivel caster wheel will be behind the pivot axis seen in the first longitudinal direction.

As realized by the inventor of the present disclosure, problems arise when the swivel caster wheel is in this position and propulsion is initiated in a second longitudinal direction of the robotic tool being opposite to the first longitudinal direction. This because the swivel caster wheel will start to rotate in a second rotational direction opposite to the first rotational direction and will start to pivot in an uncontrolled manner around the pivot axis. The pivoting direction of the swivel caster wheel is highly random and usually cannot be foreseen. The wheel axle of the swivel caster wheel will thus rotate relative to the second longitudinal direction and at a certain moment, when the wheel axle has passed the point in which the wheel axle is parallel to the second longitudinal direction, the swivel caster wheel will start to rotate in the first rotational direction. As a result thereof, high forces are transferred to the robotic tool from the ground engaging contact between the ground and the swivel caster wheel. These high forces result in unexpected changes in travel direction of the robotic tool. Moreover, these high forces provide resistance in the second longitudinal direction of the robotic tool which makes propulsion in the second longitudinal direction more difficult and therefore increases the risk of wheel slip and impairs the slope performance of the robotic tool.

However, since the control arrangement according to the present disclosure is configured to turn the robotic tool a predetermined angle before initiating propulsion in the second longitudinal direction, the at least one swivel caster wheel is pivoted to a position in which the rolling direction of the at least one swivel caster wheel is transversal to the second longitudinal direction. As a result thereof, propulsion can be initiated in the second longitudinal direction with less resistance in the second longitudinal direction and with a reduced risk of unexpected changes in travel direction of the robotic tool.

Accordingly, a control arrangement is provided capable of reducing wear and tear of an area operated in a simple and cost efficient manner. This because propulsion can be initiated in the second longitudinal direction with less resistance in the second longitudinal direction thereby reducing the risk of wheel slip of drive wheels of the robotic tool, which can reduce wear and tear of the ground surface caused by drive wheels of the robotic tool. Moreover, the controlled turning of the robotic tool and of the swivel caster wheel may reduce the wear and tear obtained from the contact between the ground surface and the swivel caster wheel. Furthermore, a control arrangement is provided capable of reducing uneven wear and tear of the area operated by the robotic tool by reducing wear and tear of the ground surface around objects which causes stop events, such as for example trees, stumps, and boundary wires.

Moreover, a control arrangement is provided having conditions for obtaining an improved coverage of an area operated by a robotic tool. This because a reduced risk of wheel slip is obtained which in turn reduces the risk of unexpected changes in travel direction of the robotic tool. Furthermore, the risk of unexpected changes in travel direction of the robotic tool is reduced due to the reduced forces transferred to the robotic tool from the contact between the ground surface and the swivel caster wheel. In addition, due to the turning of the robotic tool, the swivel caster wheel is pivoted in a known pivoting direction which further reduces the risk of unexpected changes in travel direction of the robotic tool.

Furthermore, since propulsion can be initiated in the second longitudinal direction with less resistance in the second longitudinal direction, the slope performance of the robotic tool is improved. As a further result thereof, the control arrangement provides conditions for increasing the size of an area operated by the robotic tool, for example by positioning boundary wires further down in slopes.

Accordingly, a control arrangement is provided overcoming, or at least alleviating, at least some of the above-mentioned problems and drawbacks. As a result, the above-mentioned object is achieved.

Optionally, the predetermined angle is within the range of 2 degrees to 40 degrees, or is within the range of 10 degrees to 30 degrees. Thereby, it is ensured that the at least one swivel caster wheel is pivoted to a position in which the rolling direction of the at least one swivel caster wheel is transversal to the second longitudinal direction. In this manner, it can be ensured that less resistance is obtain in the second longitudinal direction upon propulsion of the robotic tool in the second longitudinal direction.

Optionally, the control arrangement is configured to turn the robotic tool the predetermined angle around a yaw axis of the robotic tool. Thereby, conditions are provided for turning the robotic tool small predetermined angles and still obtain a pivoting angle of the swivel caster wheel sufficient for reducing the resistance in the second longitudinal direction upon propulsion of the robotic tool in the second longitudinal direction.

Optionally, the control arrangement is configured to determine a current inclination angle of the robotic tool, and is configured to turn the robotic tool the predetermined angle only if the current inclination angle is greater than a threshold inclination angle. Thereby, the control arrangement will perform the turning of the robotic tool when it is most needed and in cases where the risk for wheel slip of drive wheels of the robotic tool is high.

According to a second aspect of the invention, the object is achieved by a self-propelled robotic tool comprising:
  at least one swivel caster wheel configured to abut against a ground surface during operation of the robotic tool, and
  a propulsion control arrangement configured to, upon detection of a stop event of the robotic tool after travel in a first longitudinal direction, turn the robotic tool a predetermined angle, and then initiate propulsion in a second longitudinal direction being opposite to the first longitudinal direction.

Since the propulsion control arrangement of the robotic tool is configured to turn the robotic tool a predetermined angle before initiating propulsion in the second longitudinal direction, the at least one swivel caster wheel is pivoted to a position in which the rolling direction of the at least one swivel caster wheel is transversal to the second longitudinal direction. As a result thereof, propulsion can be initiated in the second longitudinal direction with less resistance in the second longitudinal direction and with a reduced risk of unexpected changes in travel direction of the robotic tool.

Accordingly, a robotic tool is provided capable of reducing wear and tear of an area operated in a simple and cost efficient manner. This because propulsion can be initiated in the second longitudinal direction with less resistance in the second longitudinal direction thereby reducing the risk of wheel slip of drive wheels of the robotic tool, which can reduce wear and tear of the ground surface caused by drive wheels of the robotic tool. Moreover, the controlled turning of the robotic tool and of the swivel caster wheel may reduce the wear and tear obtained from the contact between the ground surface and the swivel caster wheel. Furthermore, a robotic tool is provided capable of reducing uneven wear and tear of the area operated by the robotic tool by reducing wear and tear of the ground surface around objects which causes stop events, such as for example trees, stumps, and boundary wires.

Moreover, a robotic tool is provided having conditions for obtaining an improved coverage of an area operated by a robotic tool. This because a reduced risk of wheel slip is obtained which in turn reduces the risk of unexpected changes in travel direction of the robotic tool. Furthermore, the risk of unexpected changes in travel direction of the robotic tool is reduced due to the reduced forces transferred to the robotic tool from the contact between the ground surface and the swivel caster wheel. In addition, due to the turning of the robotic tool, the swivel caster wheel is pivoted in a known pivoting direction which further reduces the risk of unexpected changes in travel direction of the robotic tool.

Furthermore, since propulsion can be initiated in the second longitudinal direction with less resistance in the second longitudinal direction, the slope performance of the robotic tool is improved. As a further result thereof, the robotic tool provides conditions for increasing the size of an area operated by the robotic tool, for example by positioning boundary wires further down in slopes.

Accordingly, a robotic tool is provided overcoming, or at least alleviating, at least some of the above-mentioned problems and drawbacks. As a result, the above-mentioned object is achieved.

Optionally, the robotic tool further comprises:
  a first drive wheel, and
  a second drive wheel,
and wherein the propulsion control arrangement is configured to control propulsion of the robotic tool by controlling rotation of the first and second drive wheels.

Thereby, propulsion of the robotic tool can be controlled in a simple and efficient manner. Moreover, the robotic tool can be turned the predetermined angle in a simple and efficient manner so as to ensure pivoting of the swivel caster wheel.

Optionally, the propulsion control arrangement is configured to turn the robotic tool the predetermined angle by rotating the first and second drive wheels in opposite rotational directions. Thereby, the robotic tool can be turned the predetermined angle in a simple and efficient manner so as to ensure pivoting of the swivel caster wheel. Moreover, conditions are provided for turning the robotic tool small predetermined angles and still obtain a pivoting angle of the swivel caster wheel sufficient for reducing the resistance in the second longitudinal direction upon propulsion of the robotic tool in the second longitudinal direction.

Optionally, the robotic tool comprises a sensor arranged to sense a current inclination angle of the robotic tool, and wherein the propulsion control arrangement is configured to turn the robotic tool the predetermined angle only if the current inclination angle is greater than a threshold inclination angle. Thereby, the control arrangement will perform the turning of the robotic tool when it is most needed and in cases where the risk for wheel slip of drive wheels of the robotic tool is high.

Optionally, the robotic tool is a self-propelled robotic lawnmower. Thereby, a robotic lawnmower is provided in which propulsion can be initiated in the second longitudinal direction with less resistance in the second longitudinal direction and with a reduced risk of unexpected changes in travel direction of the robotic lawnmower.

Accordingly, a robotic lawnmower is provided capable of reducing wear and tear of an area operated in a simple and cost efficient manner. This because propulsion can be initiated in the second longitudinal direction with less resistance in the second longitudinal direction thereby reducing the risk of wheel slip of drive wheels of the robotic lawnmower, which can reduce wear and tear of the ground surface caused by drive wheels of the robotic lawnmower. Moreover, the controlled turning of the robotic lawnmower and of the swivel caster wheel may reduce the wear and tear obtained from the contact between the ground surface and the swivel caster wheel. Furthermore, a robotic lawnmower is provided capable of reducing uneven wear and tear of the area operated by the robotic lawnmower by reducing wear and tear of the ground surface around objects which causes stop events, such as for example trees, stumps, and boundary wires.

Moreover, a robotic lawnmower is provided having conditions for obtaining an improved coverage of an area operated by a robotic tool. This because a reduced risk of wheel slip is obtained which in turn reduces the risk of unexpected changes in travel direction of the robotic tool. Furthermore, the risk of unexpected changes in travel direction of the robotic tool is reduced due to the reduced forces transferred to the robotic tool from the contact between the ground surface and the swivel caster wheel. In addition, due to the turning of the robotic tool, the swivel caster wheel is pivoted in a known pivoting direction which further reduces the risk of unexpected changes in travel direction of the robotic tool.

Furthermore, since propulsion can be initiated in the second longitudinal direction with less resistance in the second longitudinal direction, the slope performance of the robotic lawnmower is improved. As a further result thereof, the robotic lawnmower provides conditions for increasing the size of an area operated by the robotic lawnmower, for example by positioning boundary wires further down in slopes.

Accordingly, a robotic lawnmower is provided overcoming, or at least alleviating, at least some of the above-mentioned problems and drawbacks. As a result, the above-mentioned object is achieved.

According to a third aspect of the invention, the object is achieved by a method of propelling a self-propelled robotic tool comprising at least one swivel caster wheel configured to abut against a ground surface during operation of the robotic tool, wherein the method comprises the steps of:

detecting a stop event of the robotic tool after travel in a first longitudinal direction of the robotic tool, turning the robotic tool a predetermined angle to turn the at least one swivel caster wheel to a position in which a respective rolling direction of the at least one swivel caster wheel is transversal to a second longitudinal direction being opposite to the first longitudinal direction, and then initiating propulsion in the second longitudinal direction.

Since the method comprises the step of turning the robotic tool before initiating propulsion in the second longitudinal direction, the at least one swivel caster wheel is pivoted to a position in which the rolling direction of the at least one swivel caster wheel is transversal to the second longitudinal direction. As a result thereof, propulsion can be initiated in the second longitudinal direction with less resistance in the second longitudinal direction and with a reduced risk of unexpected changes in travel direction of the robotic tool.

Accordingly, a method is provided capable of reducing wear and tear of an area operated in a simple and cost efficient manner. This because propulsion can be initiated in the second longitudinal direction with less resistance in the second longitudinal direction thereby reducing the risk of wheel slip of drive wheels of the robotic tool, which can reduce wear and tear of the ground surface caused by drive wheels of the robotic tool. Moreover, the controlled turning of the robotic tool and of the swivel caster wheel may reduce the wear and tear obtained from the contact between the ground surface and the swivel caster wheel. Furthermore, a method is provided capable of reducing uneven wear and tear of the area operated by the robotic tool by reducing wear and tear of the ground surface around objects which causes stop events, such as for example trees, stumps, and boundary wires.

Moreover, a method is provided having conditions for obtaining an improved coverage of an area operated by a robotic tool. This because a reduced risk of wheel slip is obtained which in turn reduces the risk of unexpected changes in travel direction of the robotic tool. Furthermore, the risk of unexpected changes in travel direction of the robotic tool is reduced due to the reduced forces transferred to the robotic tool from the contact between the ground surface and the swivel caster wheel. In addition, due to the turning of the robotic tool, the swivel caster wheel is pivoted in a known pivoting direction which further reduces the risk of unexpected changes in travel direction of the robotic tool.

Furthermore, since propulsion can be initiated in the second longitudinal direction with less resistance in the second longitudinal direction, the slope performance of the robotic tool is improved. As a further result thereof, the method provides conditions for increasing the size of an area operated by the robotic tool, for example by positioning boundary wires further down in slopes.

Accordingly, a method is provided overcoming, or at least alleviating, at least some of the above-mentioned problems and drawbacks. As a result, the above-mentioned object is achieved.

Optionally, the method comprises the steps of:
determining a current inclination angle of the robotic tool, and wherein the method comprises:
performing the step of turning the robotic tool the predetermined angle only if the current inclination angle is greater than a threshold inclination angle.

Thereby, the step of turning the robotic tool is performed when it is most needed and in cases where the risk for wheel slip of drive wheels of the robotic tool is high.

Optionally, the threshold inclination angle is within the range of 1.5 degrees to 7 degrees, or is within the range of 2 degrees to 5 degrees.

Thereby, the step of turning the robotic tool is performed when it is most needed and in cases where the risk for wheel slip of drive wheels of the robotic tool is high.

According to a fourth aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments, a computer program is provided which provides conditions for overcoming, or at least alleviating, at least some of the above-mentioned drawbacks. As a result, the above-mentioned object is achieved.

According to a fifth aspect of the invention, the object is achieved by a computer-readable medium comprising instructions which, when executed by a computer, cause the computer to carry out the method according to some embodiments of the present disclosure. Since the computer-readable medium comprises instructions which, when executed by a computer, cause the computer to carry out the method according to some embodiments, a computer-readable medium is provided which provides conditions for overcoming, or at least alleviating, at least some of the above-mentioned drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
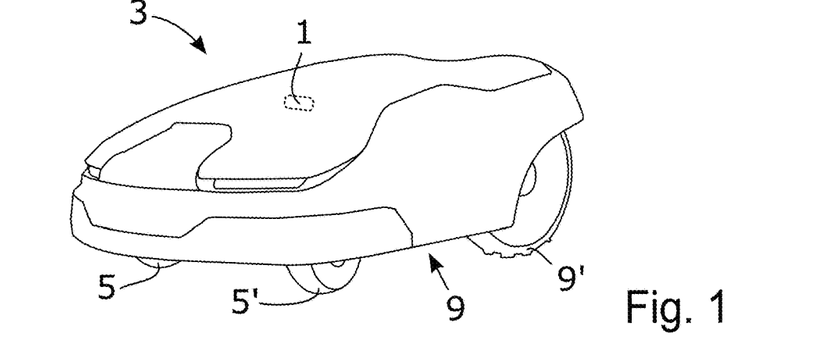
FIG. 1 illustrates a perspective view of a self-propelled robotic tool, according to some embodiments.

FIG. 1 illustrates a perspective view of a self-propelled autonomous robotic tool 3, according to some embodiments. According to the illustrated embodiments, the self-propelled robotic tool 3 is a self-propelled autonomous robotic lawnmower 3 capable of cutting grass in an area in an autonomous manner, i.e. without the intervention of a user. According to the illustrated embodiments, the robotic lawnmower 3 is configured to be used to cut grass in areas used for aesthetic and recreational purposes, such as gardens, parks, city parks, sports fields, lawns around houses, apartments, commercial buildings, offices, and the like. For the reason of brevity and clarity, the self-propelled robotic tool 3 is in some places herein referred to as "the robotic tool 3".

According to the illustrated embodiments, the robotic tool 3 comprises a first and a second drive wheel 9, 9'. The drive wheels 9, 9' may also be referred to as propulsion wheels 9, 9'. In FIG. 1, only the second drive wheel 9' is visible. Moreover, according to the embodiments illustrated in FIG. 1, the robotic tool 3 comprises two swivel caster wheels 5, 5' each configured to abut against a ground surface 7 during operation of the robotic tool 3. The swivel caster wheels 5, 5' are non-driven wheels each configured to support the robotic tool 3 during operation thereof. Moreover, according to the illustrated embodiments, the two swivel caster wheels 5, 5' constitute front wheels and the first and second drive wheels 9, 9' constitute rear wheels of the robotic tool 3. The first and second drive wheels 9, 9' are driven by a respective propulsion motor which may be powered by electricity from a battery comprised in the robotic tool 3. These propulsion motors and the battery are not illustrated in FIG. 1 for the reason of brevity and clarity.

According to the embodiments illustrated in FIG. 1, the robotic tool 3 comprises four wheels and may be referred to as a four-wheeled rear wheel driven robotic tool 3. The robotic tool 3 may be provided with another number of wheels 5, 5', 9, 9' and another configuration of driven and non-driven wheels than depicted in FIG. 1, as is further explained herein.

The robotic tool 3 comprises a propulsion control arrangement 1. The propulsion control arrangement 1 is configured to steer, turn, and navigate the robotic tool 3 by controlling rotation of the first and second drive wheels 9, 9'. The propulsion control arrangement 1 is configured to control rotation of the first and second drive wheels 9, 9' by controlling the power and direction of the respective propulsion motor. The propulsion control arrangement 1 is in some places herein referred to as "the control arrangement 1" for the reason of brevity and clarity.

Figure 2:
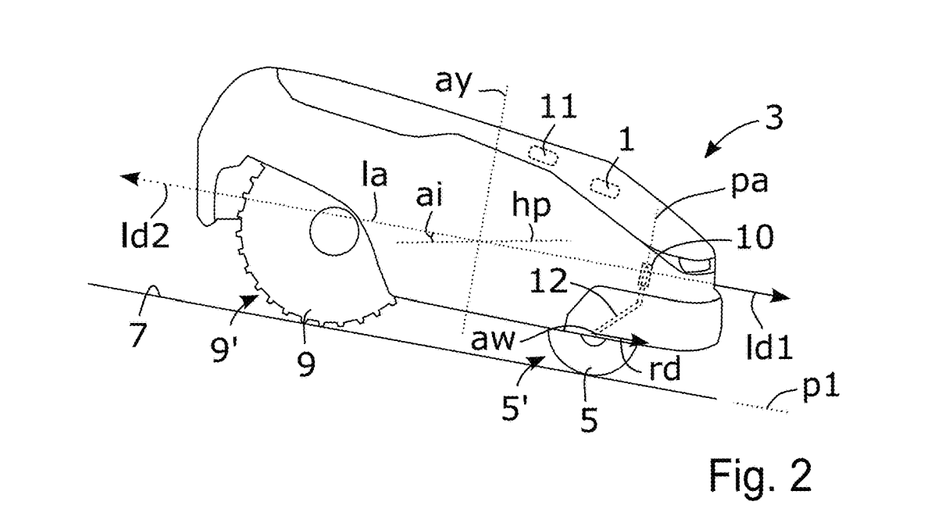
FIG. 2 illustrates a first side view of the robotic tool according to the embodiments illustrated in FIG. 1.

FIG. 2 illustrates a first side view of the robotic tool 3 according to the embodiments illustrated in FIG. 1. In FIG. 2, the robotic tool 3 is illustrated as positioned on an inclined ground surface 7. The robotic tool 3 has a first longitudinal direction ld1. The first longitudinal direction ld1 is parallel to a longitudinal axis la of the robotic tool 3. The longitudinal axis la of the robotic tool 3 is parallel to a first plane p1 extending through ground engaging portions of the wheels 5, 5', 9, 9' of the robotic tool 3, i.e. perpendicular to the ground surface 7 in case the robotic tool 3 is positioned onto a flat and planar ground surface 7. In FIG. 2, the first longitudinal direction ld1 is pointing in a direction of forward travel of the robotic tool 3. The direction of forward travel of the robotic tool 3 may also be referred to as a forward direction of the robotic tool 3 and is the direction in which the robotic tool 3 mainly operates during operation of an area. The robotic tool 3 also has a second longitudinal direction ld2. The second longitudinal direction ld2 is opposite to the first longitudinal direction ld1. In FIG. 2, the second longitudinal direction ld2 is pointing in a direction of reverse travel of the robotic tool 3. Accordingly, when the robotic tool 3 is travelling in the first longitudinal direction ld1, the swivel caster wheels 5, 5' will be located in front of the first and second drive wheels 9, 9' seen in the travelling direction, i.e. in the first longitudinal direction ld1. When the robotic tool 3 is travelling in the second longitudinal direction ld2, the first and second drive wheels 9, 9' will be located in front of the swivel caster wheels 5, 5' seen in the travelling direction, i.e. in the second longitudinal direction ld2. According to further embodiments, this may be the other way around, as is further explained herein.

As indicated in FIG. 2, each swivel caster wheel 5, 5' comprises a swivel caster assembly 10, 12. According to the illustrated embodiments, each swivel caster wheel 5, 5' comprise the same features and functions as the other swivel caster wheel 5, 5'. Therefore, below, reference is made to one of the swivel caster wheels 5, 5', if not indicated otherwise. The swivel caster assembly 10, 12 comprises a journal 10 pivotably attached to the robotic tool 3 around a pivot axis pa. The pivot axis pa is substantially perpendicular to the first plane p1, i.e. perpendicular to the ground surface 7 in case the robotic tool 3 is positioned onto a flat and planar ground surface 7. The swivel caster assembly 10, 12 further comprises a support structure 12 arranged between the journal 10 and a wheel axis aw of the swivel caster wheel 5.

The swivel caster wheel 5 is pivotally attached to the robotic tool 3 via the support structure 12 and the journal 10. As can be seen in FIG. 2, the pivot axis pa is arranged at a distance from a wheel axle aw of the swivel caster wheel 5 measured in a direction of the first plane p1. The swivel caster wheel 5 is free to pivot around the pivot axis pa 360 degrees such that a rolling direction rd of the swivel caster wheel 5 can follow a travel direction of the robotic tool 3. The rolling direction rd of the swivel caster wheel 5 is perpendicular to the wheel axle aw of the swivel caster wheel 5.

In FIG. 2, the robotic tool 3 is illustrated as travelling in the first longitudinal direction !di. As can be seen in FIG. 2, when travelling in the first longitudinal direction ld1, the rolling direction rd of the swivel caster wheel 5 is parallel to the first and second longitudinal directions ld1, ld2 and the wheel axle aw of the swivel caster wheel 5 is behind the pivot axis pa seen in the first longitudinal direction ld1.

Figure 3:
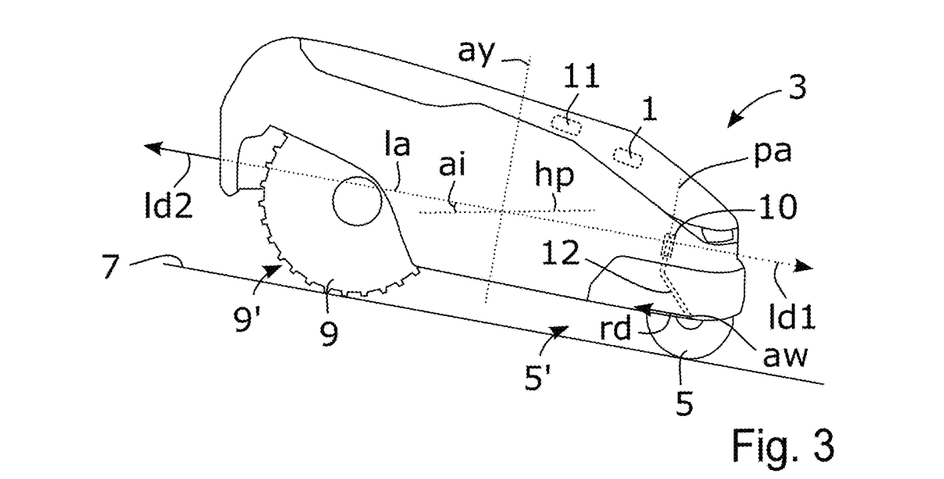
FIG. 3 illustrates a second side view of the robotic tool according to the embodiments illustrated in FIG. 1 and FIG. 2, FIG. 4a-FIG. 4d illustrate the robotic tool according to the embodiments illustrated in FIG. 1-FIG. 3 at four different positions relative to a boundary wire, FIG. 5 schematically illustrates a first top view of the swivel caster wheel according to the embodiments illustrated in FIG. 1-FIG. 3, FIG. 6 schematically illustrates a second top view of the swivel caster wheel according to the embodiments illustrated in FIG. 1-FIG. 3, FIG. 7 schematically illustrates a third top view of the swivel caster wheel according to the embodiments illustrated in FIG. 1-FIG. 3.

FIG. 3 illustrates a second side view of the robotic tool 3 according to the embodiments illustrated in FIG. 1 and FIG. 2. In FIG. 3, the robotic tool 3 is illustrated as travelling in the second longitudinal direction ld2. As can be seen in FIG. 3, when travelling in the second longitudinal direction ld2, the rolling direction rd of the swivel caster wheel 5 is parallel to the first and second longitudinal directions ld1, ld2 and the wheel axle aw of the swivel caster wheel 5 is behind the pivot axis pa seen in the first longitudinal direction ld1. Since the swivel caster wheel 5 is free to pivot around the pivot axis pa 360 degrees such that the rolling direction rd can follow the travel direction of the robotic tool 3, the swivel caster wheel 5 has a first rotational direction in which it is intended to rotate around the wheel axis aw during operation of the robotic tool 3.

As realized by the inventor of the present disclosure, problems arise when the robotic tool 3 is to change longitudinal traveling direction, such as from a forward direction of travel to a reverse direction of travel, or from a reverse direction of travel to a forward direction of travel. Such changes in longitudinal travelling direction normally occurs upon stop events, such as when the robotic tool 3 detects a boundary wire or a bumping into an object, as is further explained herein.

Below, these problems are further explained with reference to FIG. 2 and FIG. 3. In FIG. 2, the robotic tool 3 is illustrated as travelling in the first longitudinal direction ld1. As can be seen in FIG. 2, when travelling in the first longitudinal direction ld1, the rolling direction rd of the swivel caster wheel 5 is parallel to the first and second longitudinal directions ld1, ld2 and the wheel axle aw of the swivel caster wheel 5 is behind the pivot axis pa seen in the first longitudinal direction !di. Apparently, if the robotic tool 3 stops after travel in the first longitudinal direction ld1 the swivel caster wheel 5 will be in a position as illustrated in FIG. 2.

If propulsion is initiated in the second longitudinal direction ld2 of the robotic tool 3 when the swivel caster wheel 5 is in this position, the swivel caster wheel 5 will start to rotate around the wheel axle aw in a second rotational direction opposite to the first rotational direction and will start to pivot around the pivot axis pa in an uncontrolled manner. The pivoting direction of the swivel caster wheel 5 is highly random and usually cannot be foreseen. The wheel axle aw of the swivel caster wheel 5 will thus rotate relative to the second longitudinal direction ld2 and at a certain moment, when the wheel axle aw has passed the point in which the wheel axle aw is parallel to the second longitudinal direction ld2, the swivel caster wheel 5 will start to rotate in the first rotational direction. As a result thereof, high forces are transferred to the robotic tool 3 from the ground engaging contact between the ground surface 7 and the swivel caster wheel 5. These high forces result in unexpected changes in travel direction of the robotic tool 3. Moreover, these high forces provide resistance in the second longitudinal direction ld2 of the robotic tool 3 which makes propulsion in the second longitudinal direction ld2 more difficult and therefore increases the risk of wheel slip and impairs the slope performance of the robotic tool 3. The situation gets even worse if the two swivel caster wheels 5, 5' pivots in opposite pivoting directions which can occur in some cases.

Figure 4A:
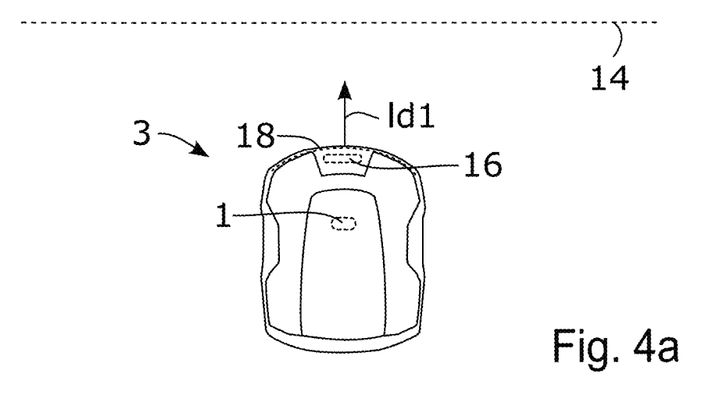
Figure 4B:
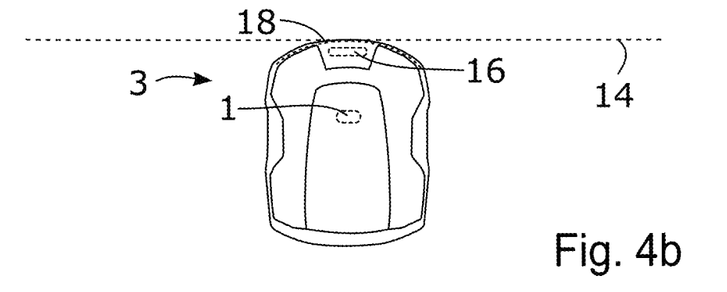

FIG. 4a-FIG. 4d illustrate the robotic tool 3 according to the embodiments illustrated in FIG. 1-FIG. 3 at four different positions relative to a boundary wire 14. In FIG. 4a, the robotic tool 3 is illustrated as travelling in the first longitudinal direction ld1 towards the boundary wire 14. In FIG. 4b, the robotic tool 3 is illustrated as having reached and stopped at the boundary wire 14. According to the illustrated embodiments, the robotic tool 3 comprises a boundary wire sensor 16 configured to detect the presence of the boundary wire 14, wherein the propulsion control arrangement is configured to stop propulsion of the robotic tool 3 in case of a detection of a boundary wire 14. The boundary wire sensor 16 may be configured to detect the presence of the boundary wire 14 by sensing a magnetic field of the boundary wire 14. Moreover, according to the illustrated embodiments, the robotic tool 3 comprises an impact sensor 18. The impact sensor 18 is configured to sense the presence of impacts between the robotic tool 3 and objects. The propulsion control arrangement 1 is configured to stop propulsion of the robotic tool 3 in case of a detection of an impact between the robotic tool 3 and an object. The impact sensor 18 may comprise one or more pressure switches, or the like, connected to a bumper, and/or outer chassis component, of the robotic tool 3. The control arrangement 1 may be configured to detect a stop event of the robotic tool 3 using input from the boundary wire sensor 16 and/or the impact sensor 18. As an alternative, or in addition, the control arrangement 1 may be configured to detect a stop event of the robotic tool 3 using input from another type of sensor or another type of device or system.

Figure 4C:
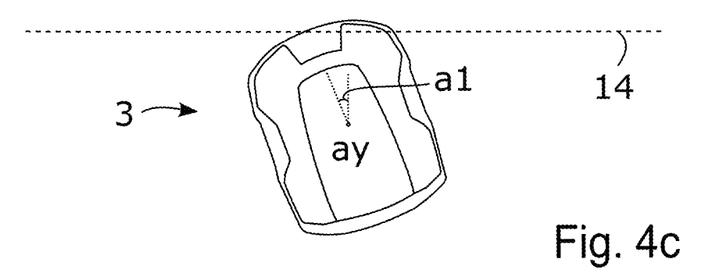
Figure 4D:
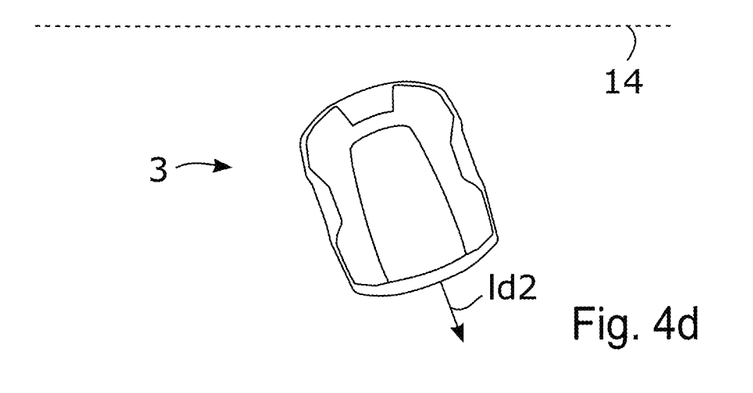

According to embodiments of the present disclosure, the control arrangement 1 is configured to, upon detection of a stop event of the robotic tool 3 after travel in a first longitudinal direction ld1 of the robotic tool 3, turn the robotic tool 3 a predetermined angle. In FIG. 4c, the robotic tool 3 is illustrated as having been turned the predetermined angle a1. As indicated in FIG. 4c, the control arrangement 1 is configured to turn the robotic tool 3 the predetermined angle a1 around a yaw axis ay of the robotic tool 3. The control arrangement 1 may be configured to turn the robotic tool 3 the predetermined angle a1 by rotating the first and second drive wheels in opposite rotational directions. The control arrangement 1 may then initiate propulsion in a second longitudinal direction ld2 of the robotic tool 3, as illustrated in FIG. 4d, being opposite to the first longitudinal direction ld1.

Figure 5:
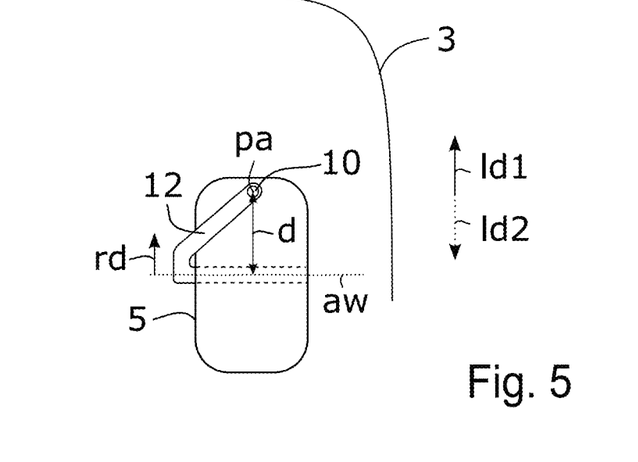

FIG. 5 schematically illustrates a first top view of the swivel caster wheel 5 according to the embodiments illustrated in FIG. 1-FIG. 3. In FIG. 5, the swivel caster wheel 5 is illustrated in a viewing direction straight towards the ground surface 7, indicated in FIG. 2 and FIG. 3. Moreover, in FIG. 5, the swivel caster wheel 5 is illustrated in a position obtained when the robotic tool 3 is traveling in the first longitudinal direction !di. As can be seen in FIG. 5, when travelling in the first longitudinal direction ld1, the rolling direction rd of the swivel caster wheel 5 is parallel to the first and second longitudinal directions ld1, ld2 and the wheel axle aw of the swivel caster wheel 5 is behind the pivot axis pa seen in the first longitudinal direction ld1. Moreover, the distance d between the pivot axis pa and the wheel axle aw in the first longitudinal direction ld1 is indicated in FIG. 5.

When the robotic tool 3 is travelling in the first longitudinal direction ld1 towards the boundary wire 14, as illustrated in FIG. 4a, the swivel caster wheel 5 will assume a position as illustrated in FIG. 5. When the robotic tool 3 stops at the boundary wire, as illustrated in FIG. 4b, the swivel caster wheel 5 will apparently remain in the position as illustrated in FIG. 5. When the control arrangement 1 initiates turning of the robotic tool 3, a torque is obtained onto the swivel caster wheel 5 around the pivot axis pa due to a force obtained from the ground engaging contact of the swivel caster wheel 5 which acts on the support structure 12 of the swivel caster wheel 5.

Figure 6:
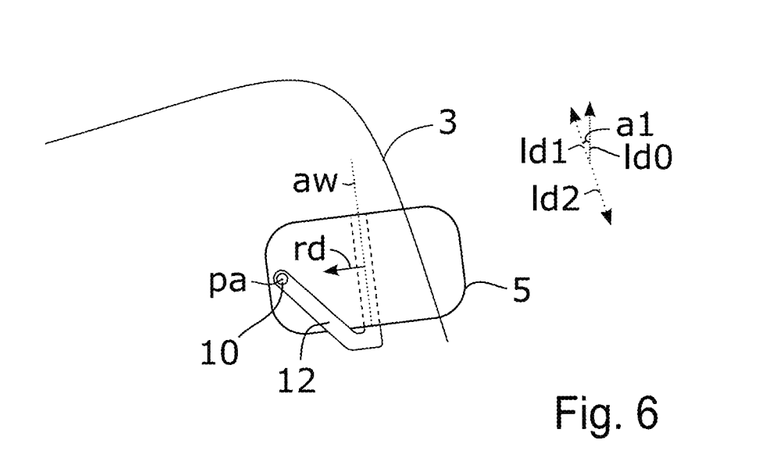

FIG. 6 schematically illustrates a second top view of the swivel caster wheel 5 according to the embodiments illustrated in FIG. 1-FIG. 3. In FIG. 6, the swivel caster wheel 5 is illustrated in a position obtained when the robotic tool 3 has been turned the predetermined angle a1. Thus, in FIG. 6, the swivel caster wheel 5 is in a position obtained when the robotic tool 3 is in the position illustrated in FIG. 4c. In FIG. 6, the arrow ld0 denotes the previous direction of the first longitudinal direction ld1 before the turning of the robotic tool 3 was initiated. As can be seen in FIG. 6, as a result of the turning of the robotic tool 3 the predetermined angle a1, the swivel caster wheel 5 has been pivoted around the pivot axis pa such that the rolling direction of the swivel caster wheel 5 is transversal to the first and second longitudinal directions ld1, ld2 of the robotic tool 3. As explained above, the pivoting of the swivel caster wheel 5 is a result of the torque obtained onto the swivel caster wheel 5 around the pivot axis pa due to the force obtained from the ground engaging contact of the swivel caster wheel 5 which acts on the support structure 12 of the swivel caster wheel 5.

According to the illustrated embodiments, the predetermined angle a1 is approximately 20 degrees. According to further embodiments, the predetermined angle a1 may be within the range of 7 degrees to 40 degrees, or within the range of 10 degrees to 30 degrees.

As can be seen in FIG. 6, the swivel caster wheel 5 has been pivoted an angle which is greater than the predetermined turning angle a1 of the robotic tool 3. This is a result of the fact that according to the illustrated embodiments, the distance d between the pivot axis pa and the wheel axis aw of the swivel caster wheel 5 is shorter than the distance between the pivot axis pa of the swivel caster wheel 5 and the yaw axis of the robotic tool 3 measured in the first plane.

When the swivel caster wheel 5 is in the position illustrated in FIG. 6, the control arrangement can initiate propulsion in the second longitudinal direction ld2 and as a result thereof, a torque is obtained onto the swivel caster wheel 5 around the pivot axis pa due to the force obtained from the ground engaging contact of the swivel caster wheel 5 acting on the support structure 12 of the swivel caster wheel 5.

Figure 7:
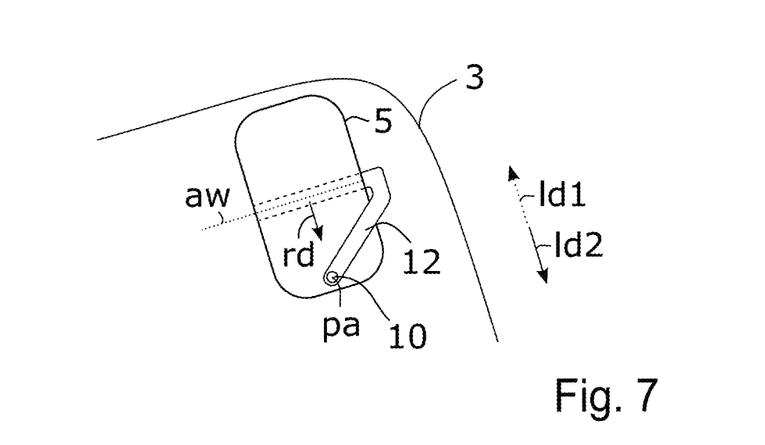

FIG. 7 schematically illustrates a third top view of the swivel caster wheel 5 according to the embodiments illustrated in FIG. 1-FIG. 3. In FIG. 7, the swivel caster wheel 5 is illustrated in a position obtained when the robotic tool 3 has travelled a distance in the second longitudinal direction ld2. Thus, in FIG. 7, the swivel caster wheel 5 is illustrated in a position obtained when the robotic tool 3 is in the position illustrated in FIG. 4d. As can be seen in FIG. 7, the swivel caster wheel 5 has been pivoted around the pivot axis pa such that the rolling direction rd of the swivel caster wheel 5 is parallel to the first and second longitudinal directions ld1, ld2 and the wheel axle aw of the swivel caster wheel 5 is behind the pivot axis pa seen in the first longitudinal direction !di. When the robotic tool 3 has travelled a distance in the second longitudinal direction ld2, the control arrangement 1 may turn the robotic tool 3 to a random direction and initiate propulsion in the first longitudinal direction ld1.

Below, simultaneous reference is made to FIG. 1-FIG. 7. As understood from the above, since the control arrangement 1 is configured to turn the robotic tool 3 the predetermined angle a1 before initiating propulsion in the second longitudinal direction ld2 of the robotic tool 3, the swivel caster wheel 5 is pivoted in a controlled manner around the pivot axis pa. Moreover, when the swivel caster wheel 5 is in the position illustrated in FIG. 7, propulsion can be initiated in the second longitudinal direction ld2 with less resistance in the second longitudinal direction ld2 and with a reduced risk of unexpected changes in travel direction of the robotic tool 3. Moreover, the lower resistance in the second longitudinal direction ld2 reduces the risk of wheel slip of drive wheels 9, 9' of the robotic tool 3, which can reduce wear and tear of an area operated by the robotic tool. Moreover, the controlled turning of the robotic tool 3 and of the swivel caster wheel 5 may reduce the wear and tear obtained from the contact between the ground surface 7 and the swivel caster wheel 5. Furthermore, a control arrangement 1 is provided capable of reducing uneven wear and tear of the area operated by the robotic tool by reducing wear and tear of the ground surface 7 around objects which causes stop events, such as for example trees, stumps, and boundary wires 14.

Moreover, a control arrangement 1 is provided having conditions for obtaining an improved coverage of an area operated by a robotic tool 3. This because a reduced risk of wheel slip is obtained and a reduced risk of unexpected changes in travel direction of the robotic tool 3 is obtained due to reduced forces transferred to the robotic tool 3 from the contact between the ground surface and the swivel caster wheel 5. Moreover, due to the turning of the robotic tool 3, the swivel caster wheel will be pivoted in a known pivoting direction which further reduces the risk of unexpected changes in travel direction of the robotic tool 3.

Furthermore, since propulsion can be initiated in the second longitudinal direction ld2 with less resistance in the second longitudinal direction ld2, the slope performance of the robotic tool 3 is improved. As a further result thereof, the control arrangement 1 provides conditions for increasing the size of an area operated by the robotic tool 3, for example by positioning boundary wires 14 further down in slopes.

As indicated in FIG. 2 and FIG. 3, according to the illustrated embodiments, the robotic tool 3 comprises a sensor 11 arranged to sense a current inclination angle ai of the robotic tool 3 relative a horizontal plane hp in the first longitudinal direction !di. The sensor 11 may be configured to sense the orientation of the robotic tool 3 relative to the gravitational field at the location of the robotic tool 3 to thereby sense the current inclination angle ai of the robotic tool 3 relative a horizontal plane hp. According to such embodiments, the sensor 11 may comprise an accelerometer. As an alternative, or in addition, the sensor 11 may be configured to sense angular displacements of the robotic tool 3. According to such embodiments, the sensor 11 may comprise a gyroscope. Moreover, the control arrangement 1 may be arranged to obtain reference values at one or more predetermined locations, such as at a charging dock. According to still further embodiments, the control arrangement 1 may be configured to obtain the current inclination angle ai of the robotic tool 3 by receiving the current inclination angle ai of the robotic tool 3 from an external source, and/or by comparing a current position of the robotic tool 3 and map data comprising inclination data of the area.

According to the illustrated embodiments, the propulsion control arrangement 1 is configured to turn the robotic tool 3 the predetermined angle a1 only if the current inclination angle ai is greater than a threshold inclination angle. The threshold inclination angle may be within the range of 1.5 degrees to 7 degrees, or is within the range of 2 degrees to 5 degrees. Due to these features, the control arrangement 1 will perform the turning of the robotic tool 3 when it is most needed and in cases where the risk for wheel slip of drive wheels 9, 9' is high. Thus, according to these embodiments, the control arrangement 1 may initiate propulsion in the second longitudinal direction ld2 upon detection of a stop event of the robotic tool 3 after travel in the first longitudinal direction ld1, without turning the robotic tool 3 the predetermined angle a1, if the current inclination angle ai is smaller than the threshold inclination angle.

The predetermined angle a1, as referred to herein, may not be a fixed angle. Instead, the control arrangement 1 may be configured to determine the angle a1 based on input data, such as for example the current inclination angle ai of the robotic tool 3. According to further embodiments, the predetermined angle a1, as referred to herein, may be an angle a1 set randomly within an angle interval. Even such an angle a1 can be said to be predetermined since the angle a1 is set within an angle interval.

Figure 8:
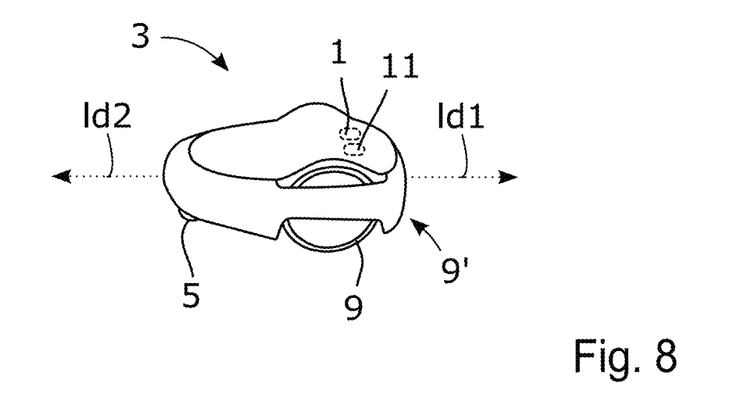
FIG. 8 illustrates a self-propelled autonomous robotic tool, according to some further embodiments.

FIG. 8 illustrates a self-propelled autonomous robotic tool 3, according to some further embodiments. According to the illustrated embodiments, the self-propelled robotic tool 3 is a self-propelled autonomous robotic lawnmower 3. According to the embodiments illustrated in FIG. 8, the robotic lawnmower 3 is configured to be used to cut grass in areas used for aesthetic and recreational purposes, such as gardens, parks, city parks, sports fields, lawns around houses, apartments, commercial buildings, offices, and the like. For the reason of brevity and clarity, the self-propelled robotic tool 3 is in some places herein referred to as "the robotic tool 3".

According to the illustrated embodiments, the robotic tool 3 comprises a first and a second drive wheel 9, 9'. In FIG. 8, only the first drive wheel 9 is visible. Moreover, according to the embodiments illustrated in FIG. 8, the robotic tool 3 comprises one swivel caster wheel 5 configured to abut against a ground surface 7 during operation of the robotic tool 3. The swivel caster wheel 5 is a non-driven wheel configured to support the robotic tool 3 during operation thereof. Thus, according to the illustrated embodiments, the robotic tool 3 comprises three wheels 9, 9', 5. According to the embodiments illustrated in FIG. 8, the robotic tool 3 may be referred to as a three-wheeled front wheel driven robotic tool 3. Thus, according to the embodiments illustrated in FIG. 8, the first and a second drive wheel 9, 9' constitute front wheels and the swivel caster wheels 5 constitute a rear wheel of the robotic tool 3. The first and second drive wheels 9, 9' are driven by a respective propulsion motor which may be powered by electricity from a battery comprised in the robotic tool 3. These propulsion motors and the battery are not illustrated in FIG. 8 for the reason of brevity and clarity.

In FIG. 8, the first longitudinal direction ld1 is pointing in a direction of forward travel of the robotic tool 3. The robotic tool 3 also has a second longitudinal direction ld2. The second longitudinal direction ld2 is opposite to the first longitudinal direction ld1. In FIG. 8, the second longitudinal direction ld2 is pointing in a direction of reverse travel of the robotic tool 3. Accordingly, when the robotic tool 3 is travelling in the first longitudinal direction ld1, the swivel caster wheels 5, 5' will be behind the first and second drive wheels 9, 9' seen in the travelling direction, i.e. in the first longitudinal direction ld1. When the robotic tool 3 is travelling in the second longitudinal direction ld2, the first and second drive wheels 9, 9' will be behind the swivel caster wheels 5, 5' seen in the travelling direction, i.e. in the second longitudinal direction ld2. According to further embodiments, this may be the other way around, as explained herein. Moreover, the robotic tool 3 may be provided with another number of wheels 5, 9, 9' and another configuration of driven and non-driven wheels than depicted in FIG. 8, as is further explained herein.

The robotic tool 3 comprises a propulsion control arrangement 1. Moreover, the robotic tool 3 comprises a sensor 11 arranged to sense a current inclination angle of the robotic tool 3. The propulsion control arrangement 1 is configured to steer, turn, and navigate the robotic tool 3 by controlling rotation of the first and second drive wheels 9, 9'. The propulsion control arrangement 1 is configured to control rotation of the first and second drive wheels 9, 9' by controlling the power and direction of the respective propulsion motor. The propulsion control arrangement 1 is in some places herein referred to as "the control arrangement 1" for the reason of brevity and clarity.

The propulsion control arrangement 1 of the robotic tool 3 according to the embodiments illustrated in FIG. 8 may comprise the same features, functions, and advantages as the control arrangement 1 described with reference to FIG. 1-FIG. 7. Moreover, the swivel caster wheel 5 and the sensor 11 of the robotic tool 3 according to the embodiments illustrated in FIG. 8 may comprise the same features, functions, and advantages as the swivel caster wheel 5 and the sensor 11 described with reference to FIG. 1-FIG. 7. Therefore, these components 1, 5, 11 of the robotic tool 3 are not further explained herein.

Figure 9:
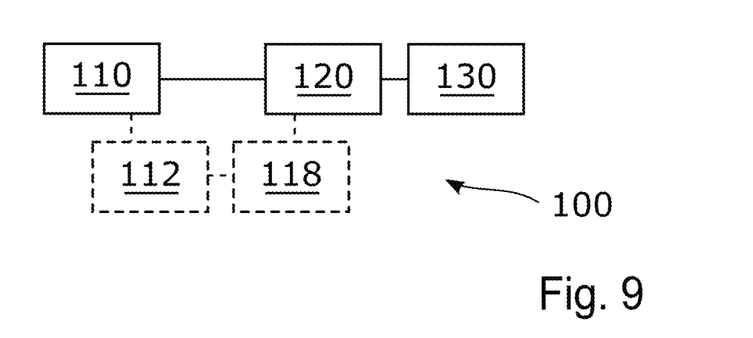
FIG. 9 illustrates a method of propelling a self-propelled robotic tool.

FIG. 9 illustrates a method 100 of propelling a self-propelled robotic tool 3. The self-propelled robotic tool may be a self-propelled robotic tool 3 according to the embodiments illustrated in FIG. 1-FIG. 7, or a self-propelled robotic tool 3 according to the embodiments illustrated in FIG. 8. Therefore, below, simultaneous reference is made to FIG. 1-FIG. 9. FIG. 9 illustrates a method 100 of propelling a self-propelled robotic tool 3 comprising at least one swivel caster wheel 5, 5' configured to abut against a ground surface 7 during operation of the robotic tool 3, wherein the method 100 comprises the steps of:

- detecting 110 a stop event of the robotic tool 3 after travel in a first longitudinal direction ld1 of the robotic tool 3,
- turning 120 the robotic tool 3 a predetermined angle a1 to turn the at least one swivel caster wheel 5, 5' to a position in which a respective rolling direction rd of the at least one swivel caster wheel 5, 5' is transversal to a second longitudinal direction ld2 being opposite to the first longitudinal direction ld1, and then
- initiating 130 propulsion in the second longitudinal direction ld2.

As illustrated in FIG. 9, the method 100 may comprise the steps of:

- determining 112 a current inclination angle ai of the robotic tool 3, and wherein the method 100 comprises:
- performing 118 the step of turning 120 the robotic tool 3 the predetermined angle a1 only if the current inclination angle ai is greater than a threshold inclination angle.

According to some embodiments, the threshold inclination angle may be within the range of 1.5 degrees to 7 degrees, or within the range of 2 degrees to 5 degrees.

It will be appreciated that the various embodiments described for the method 100 are all combinable with the propulsion control arrangement 1 as described herein. That is, the propulsion control arrangement 1 may be configured to perform any one of the method steps 110, 112, 118, 120, and 130 of the method 100.

Figure 10:
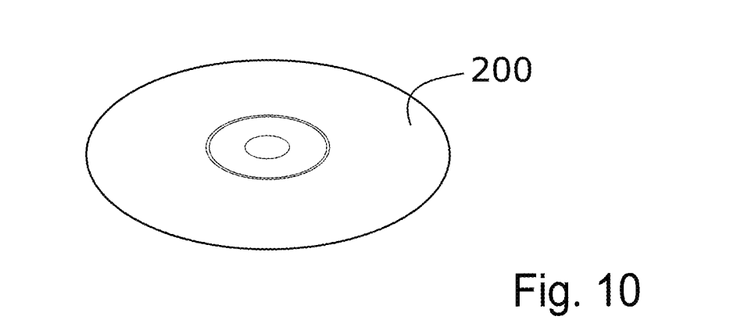
FIG. 10 illustrates computer-readable medium.

FIG. 10 illustrates computer-readable medium 200 comprising instructions which, when executed by a computer, cause the computer to carry out the method 100 according to some embodiments of the present disclosure.

According to some embodiments, the computer-readable medium 200 comprises a computer program comprising instructions which, when the program is executed by a computer, cause the computer to carry out the method 100 according to some embodiments.

One skilled in the art will appreciate that the method 100 of propelling a self-propelled robotic tool 3 may be implemented by programmed instructions. These programmed instructions are typically constituted by a computer program, which, when it is executed in the propulsion control arrangement 1, ensures that the propulsion control arrangement 1 carries out the desired control, such as the method steps 110, 112, 118, 120, and 130 described herein. The computer program is usually part of a computer program product 200 which comprises a suitable digital storage medium on which the computer program is stored.

The propulsion control arrangement 1 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The propulsion control arrangement 1 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The propulsion control arrangement 1 is connected to components of the robotic tool 3 for receiving and/or sending input and output signals. These input and output signals may comprise waveforms, pulses, or other attributes which the input signal receiving devices can detect as information and which can be converted to signals processable by the propulsion control arrangement 1. These signals may then be supplied to the calculation unit. One or more output signal sending devices may be arranged to convert calculation results from the calculation unit to output signals for conveying to other parts of the robotic tool's control system and/or the component or components for which the signals are intended. Each of the connections to the respective components of the robotic tool 3 for receiving and sending input and output signals may take the form of one or more from among a cable, a data bus, e.g. a CAN (controller area network) bus, or some other bus configuration, or a wireless connection.

In the embodiments illustrated, the robotic tool 3 comprises a propulsion control arrangement 1 but might alternatively be implemented wholly or partly in two or more control arrangements or two or more control units.

The computer program product 200 may be provided for instance in the form of a data carrier carrying computer program code for performing at least some of the method steps 110, 112, 118, 120, and 130 according to some embodiments when being loaded into one or more calculation units of the propulsion control arrangement 1. The data carrier may be, e.g. a CD ROM disc, as is illustrated in FIG. 10, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the propulsion control arrangement 1 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A propulsion control arrangement for a self-propelled robotic tool,
    wherein the robotic tool having a front end associated with a forward direction and a rear end associated with a reverse direction, the robotic tool comprises at least one swivel caster wheel configured to abut against a ground surface during operation of the robotic tool,
    and wherein the control arrangement is configured to, upon detection of a stop event of the robotic tool after travel in a first longitudinal direction of the robotic tool that is associated with the forward direction relative to the robotic tool and that is parallel to a longitudinal axis of the robotic tool, turn the robotic tool a predetermined angle to turn the at least one swivel caster wheel to a position in which a respective rolling direction of the at least one swivel caster wheel is transversal to a second longitudinal direction of the robotic tool that is associated with the reverse direction relative to the robotic tool,
    and then initiate propulsion in the second longitudinal direction of the robotic tool that is straight and parallel to the longitudinal axis of the robotic tool, wherein the second longitudinal direction is opposite to the first longitudinal direction.

2. The control arrangement according to claim 1, wherein the predetermined angle is within the range of 2 degrees to 40 degrees.

3. The control arrangement according to claim 1, wherein the control arrangement is configured to turn the robotic tool the predetermined angle around a yaw axis of the robotic tool.

4. The control arrangement according to claim 1, wherein the control arrangement is configured to determine a current inclination angle of the robotic tool, and is configured to turn the robotic tool the predetermined angle only if the current inclination angle is greater than a threshold inclination angle.

5. A self-propelled robotic tool having a front end associated with a forward direction and a rear end associated with a reverse direction, the robotic tool comprising:
    at least one swivel caster wheel configured to abut against a ground surface during operation of the robotic tool, and
    a propulsion control arrangement configured to, upon detection of a stop event of the robotic tool after travel in a first longitudinal direction of the robotic tool that is associated with the forward direction relative to the robotic tool and that is parallel to a longitudinal axis of the robotic tool, turn the robotic tool a predetermined angle to turn the at least one swivel caster wheel to a position in which a respective rolling direction of the at least one swivel caster wheel is transversal to a second longitudinal direction of the robotic tool that is associated with the reverse direction relative to the robotic tool, and then initiate propulsion in the second longitudinal direction of the robotic tool that is parallel to the longitudinal axis of the robotic tool, wherein the second longitudinal direction is straight and opposite to the first longitudinal direction, and wherein the front end defines a leading edge when travelling in the forward direction and the rear end defines the leading edge when travelling the in the reverse direction.

6. The robotic tool according to claim 5, wherein the robotic tool further comprises:
    a first drive wheel, and
    a second drive wheel,
    and wherein the propulsion control arrangement is configured to control propulsion of the robotic tool by controlling rotation of the first and second drive wheels.

7. The robotic tool according to claim 6, wherein the propulsion control arrangement is configured to turn the robotic tool the predetermined angle by rotating the first and second drive wheels in opposite rotational directions.

8. The robotic tool according to claim 5, wherein the robotic tool comprises a sensor arranged to sense a current inclination angle of the robotic tool, and wherein the propulsion control arrangement is configured to turn the robotic tool the predetermined angle only if the current inclination angle is greater than a threshold inclination angle.

9. The robotic tool according to claim 5, wherein the robotic tool is a self-propelled robotic lawnmower.

10. A method of propelling a self-propelled robotic tool having a front end associated with a forward direction and a rear end associated with a reverse direction, the robotic tool comprising at least one swivel caster wheel configured to abut against a ground surface during operation of the robotic tool, the method comprising:
    (i) detecting a stop event of the robotic tool after travel in a first longitudinal direction of the robotic tool that is associated with the forward direction relative to the robotic tool and that is parallel to a longitudinal axis of the robotic tool,
    (ii) turning the robotic tool a predetermined angle to turn the at least one swivel caster wheel to a position in which a respective rolling direction of the at least one swivel caster wheel is transversal to a second longitudinal direction being opposite to the first longitudinal direction, and then
    (iii) after completion of step (ii) initiating propulsion in the second longitudinal direction that is associated with the reverse direction relative to the robotic tool that is straight and parallel to the longitudinal axis of the robotic tool.

11. The method according to claim 10, wherein the method further comprises:
    determining a current inclination angle of the robotic tool, and
    performing the step of turning the robotic tool the predetermined angle only if the current inclination angle is greater than a threshold inclination angle.

12. The method according to claim 11, wherein the threshold inclination angle is within the range of 1.5 degrees to 7 degrees, or is within the range of 2 degrees to 5 degrees.

13. A computer program comprising instructions which, when the program is executed by a computer, cause the computer to carry out the method according to claim 10.

14. A computer-readable medium comprising instructions which, when executed by a computer, cause the computer to carry out the method according to claim 10.

\* \* \* \* \*

UNITED STATES PATENT AND TRADEMARK OFFICE
CERTIFICATE OF CORRECTION

PATENT NO. : 12,140,953 B2
APPLICATION NO. : 17/032089
DATED : November 12, 2024
INVENTOR(S) : Olle Hjelmaker

Page 1 of 1

It is certified that error appears in the above-identified patent and that said Letters Patent is hereby corrected as shown below:

In the Claims

In Column 18, Claim 5, Line 9, "travelling the in" should read as -- travelling in --

Signed and Sealed this
Eighth Day of April, 2025

Coke Morgan Stewart
*Acting Director of the United States Patent and Trademark Office*